Oct. 15, 1957 J. COUËLLE 2,809,415
MOLDING OF BUILDING ELEMENTS OF ELONGATED SHAPE
Filed Nov. 28, 1955 3 Sheets-Sheet 1
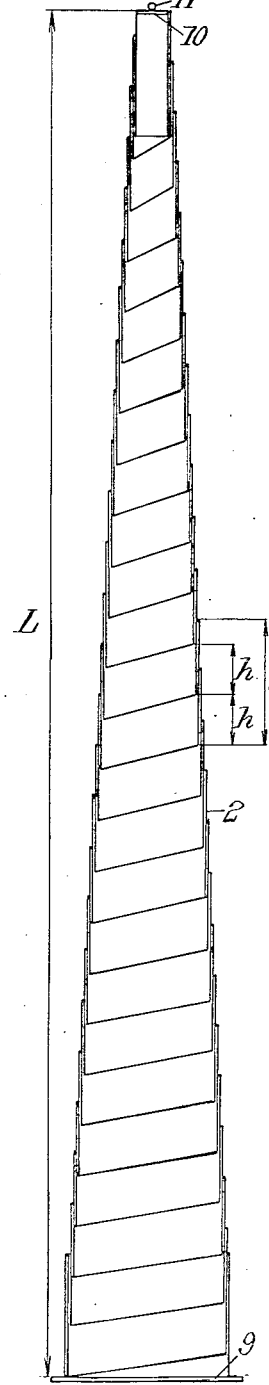
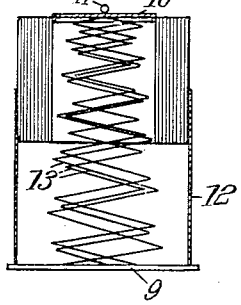
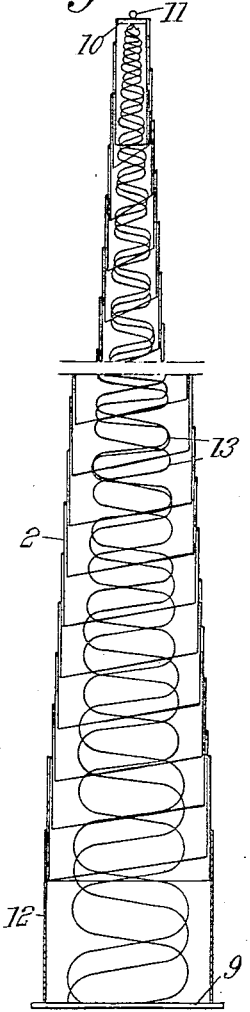
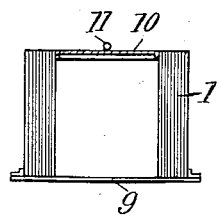
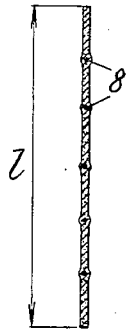
INVENTOR
Jacques Couëlle
BY
ATTORNEYS Oct. 15, 1957   J. COUËLLE   2,809,415
MOLDING OF BUILDING ELEMENTS OF ELONGATED SHAPE
Filed Nov. 28, 1955   3 Sheets-Sheet 2

INVENTOR
Jacques Couëlle
BY
ATTORNEYS

Oct. 15, 1957 J. COUËLLE 2,809,415
MOLDING OF BUILDING ELEMENTS OF ELONGATED SHAPE
Filed Nov. 28, 1955 3 Sheets-Sheet 3

INVENTOR
Jacques Couëlle
BY
Bailey, Stephens & Huettig
ATTORNEYS

United States Patent Office 2,809,415
Patented Oct. 15, 1957

2,809,415

MOLDING OF BUILDING ELEMENTS OF ELONGATED SHAPE

Jacques Couëlle, Paris, France

Application November 28, 1955, Serial No. 549,449

2 Claims. (Cl. 25—155)

The present invention relates to the molding of building elements of elongated shape such as towers, posts, piles, stakes, beams, etc.

The chief object of my invention is to provide a method of this kind which is better adapted to meet the requirements of practice than those used up to the present time.

My invention consists essentially in rolling up a continuous strip of flexible material into at least one roll the turns of which at least substantially cover one another and pulling apart the ends of said rolled strip in opposed direction parallel to the axis of said roll to a distance such that the successive turns of said strip overlap one another so as to form an elongated hollow body of frusto-conical shape constituted by the successive turns of said flexible material, and subsequently filling the molds thus obtained with a moldable material.

Preferred embodiments of my invention will be hereinafter described with reference to the accompanying drawings, given merely by way of example and in which:

Figs. 1 and 2 show a mold made according to the invention, respectively in the initial form of a roll and in the expanded form where such a mold is to be used.

Fig. 3 is a sectional view, on an enlarged scale, of a strip to be used for making the roll illustrated by Fig. 1.

Figs. 4, 5 and 6, 7 show two different molds made according to respective modifications of the method illustrated by Figs. 1 and 2 respectively.

According to my invention, I start from a strip 1 of flexible material and I roll up this strip so as to form a roll as illustrated by Fig. 1 where the successive turns of strip 1 cover one another. The respective ends of the strip thus rolled up are then pulled apart in a direction parallel to the axis of the roll and the whole is thus given a shape as illustrated by Fig. 2, the different turns of strip 1 overlapping one another so as to limit a hollow elongated body of frusto-conical shape, which can then be filled with a moldable material.

In the case of Fig. 1, I make use of a single roll and I obtain a mold for making solid elements.

Figure 6:
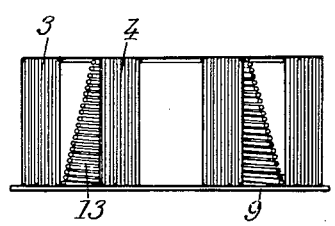

I may also, as shown by Fig. 6, make use of two coaxial rolls 3 and 4 and expand them simultaneously so as to obtain two molds which are also coaxial as shown at 5 and 6 (Fig. 7), the annular space 7 between these two molds being intended to be filled with the moldable material so as to permit of obtaining hollow molded elements.

Figure 7:
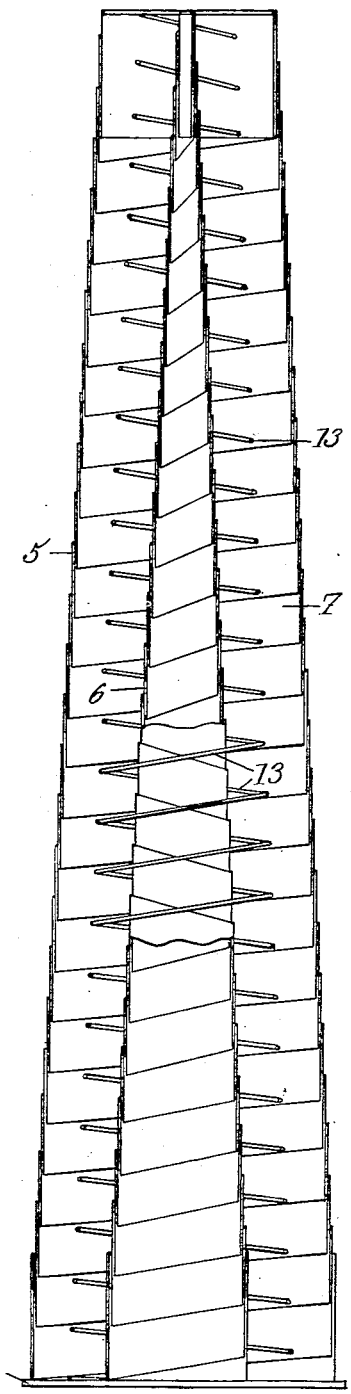

It should be noted that on the drawings, for the sake of clarity, the thickness of the strip has been exaggerated, which explains the great apex angle of the mold surface (Figs. 2, 5 and 7).

I may also combine at least two tubular molds such as shown by Fig. 2 by engaging them in each other, said molds being preferably constituted by helical surfaces wound in opposed directions, which permits of obtaining a kind of mutual bracing of these two molds.

As above stated, molds made according to the present invention have a frusto-conical shape, that is to say their diameter is greater at one end than at the other. The inner and outer surfaces of the mold may thus be made so that the generatrices are curvilinear, either concave or convex, such as A and C on Fig. 9. They may also be rectilinear as shown at B on Fig. 2. It is also possible to obtain polygonal generatrices which are made by a succession of curves and/or lines.

In order to determine the shape of these surfaces, it suffices, the thickness $e$ of the strip being supposed to be constant, to determine in a suitable manner the pitches of the respective turns, this operation being effected by a relative axial and/or tangential displacement of these turns.

Figure 9:
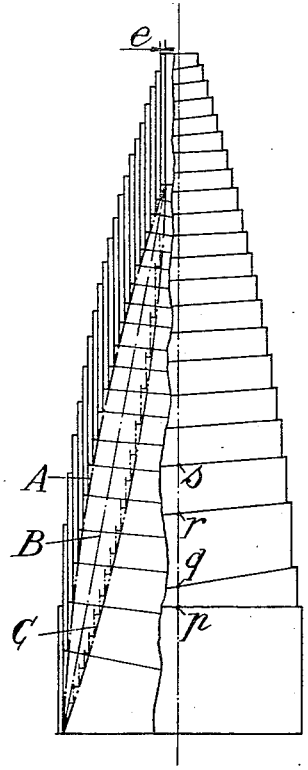
Fig. 9 illustrates the possibility of obtaining, according to the invention, molds of different shapes.

In order to obtain series of molds of a predetermined shape, I make a model, for instance that shown in solid lines on Fig. 9, which corresponds to generatrix A. It is then possible—

Figure 10:
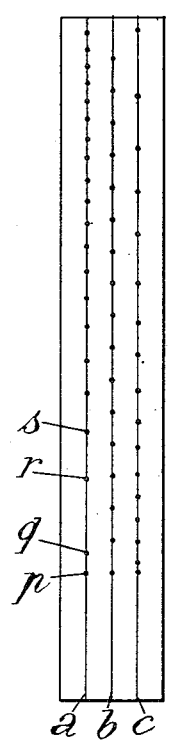
Figs. 10 and 11 show respectively a gauge and a developed ribbon arranged to facilitate the obtainment of molds of predetermined shapes.

Either to mark on this model the points of intersection $p, q, r, s$, etc., of a generatrix of the outer surface of the mold with the visible edges of the successive turns, and to plot these points on a gauge such as shown on Fig. 10, and then to apply this gauge on a generatrix of every mold as it is being made so that points $p, q, r, s$, etc., coincide on the mold and on the gauge (on Fig. 10, lines $a$, $b$ and $c$ correspond substantially to molds having generatrices such as A, B, C of Fig. 9)—

Figure 11:
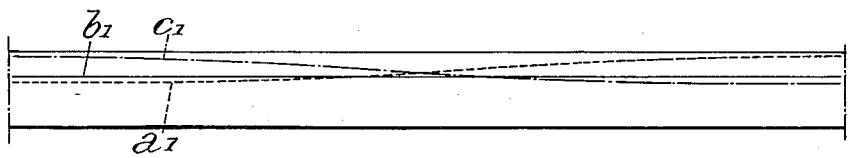

Or to mark in a continuous fashion on the strip the visible edge of every turn, which gives on the developed strip a continuous line such as $a_1$, $b_1$ or $c_1$ on Fig. 11, after which this line is reproduced on the strips intended for the construction of a given series of molds and it is used to arrange the successive turns of these molds accordingly.

As flexible material to constitute the strip, I may choose paper, for instance strong paper, either reinforced or not by wires which may be embedded in the paper (as shown at 8 on Fig. 3) or glued on the surface thereof, or some synthetic resins such as polyvinyl chloride, or again fabrics, etc.

Preferably, the number $n$ of turns of the initial roll and the width $l$ of the ribbon are chosen as a function of the length $L$ to be given to the final mold, in such manner that, in this mold, every turn is covered at least by one thickness of strip, as shown on Figs. 2, 5 and 7. If $h$ is the pitch (supposed to be constant) of a turn, this condition is written $$h \leq \frac{l}{2}$$

Now, $h$ is equal to the elongation of the roll for every turn, that is to say $$\frac{L-l}{n}$$

The condition may finally be written $$L \leq l\left(1+\frac{n}{2}\right) < \frac{nl}{2}$$

which permits of easily choosing the various parameters.

It has been supposed that the width of the strip is uniform, but it is of course possible to give it a variable width, so as to increase the importance of the mutual overlapping of the turns, that is to say the strength of the mold, in zones thereof where the stresses are to be particularly high during molding.

In order to facilitate the pulling apart of the ends of the roll (Fig. 1) or of the rolls (Fig. 6), I may provide said ends with any suitable holding devices. For instance I may fix on at least one of the end turns a transverse rod 9 (Fig. 1) or a cap 10 with a solid or apertured bottom which is advantageously provided with a ring 11. I may also fix, on at least one of the end of the end turns, a tube such as 12 (Fig. 4) made of a relatively rigid material and mount the holding means on this tube. The tube wholly or partly covers the corresponding turn and may, as shown, project to the outside of the roll.

According to a particularly advantageous solution, I may dispose inside the initial roll, or inside the space comprised between the two initial rolls, expansible reinforcements the ends of which are fixed respectively to the inner end turn and the outer end turn of the roll, these reinforcements being adapted, when the rolls are expanded, to be distributed inside the mold.

Advantageously, these reinforcements are constituted, as shown at 13 on Figs. 4 and 6, in a manner analogous to a coil spring having relatively tight turns, so as to obtain, in the expanded mold, helical reinforcements with loose turns. I may also have recourse to several such coils disposed coaxially, as shown on Fig. 4, and give each coil a frusto-conical shape such that the reinforcement is distributed in a manner as uniform as possible inside the molding space (see Figs. 5 and 7). The reinforcements 13 may be made of metal, glass, synthetic resin such as "nylon," etc.

With this method, and whatever be the particular embodiment that is chosen, I obtain molds for making elongated building elements which are easy to manufacture, of light weight, easy to handle, made of a cheap material and which may be stored in the non-expanded state, under an extraordinarily small volume.

Figure 8:
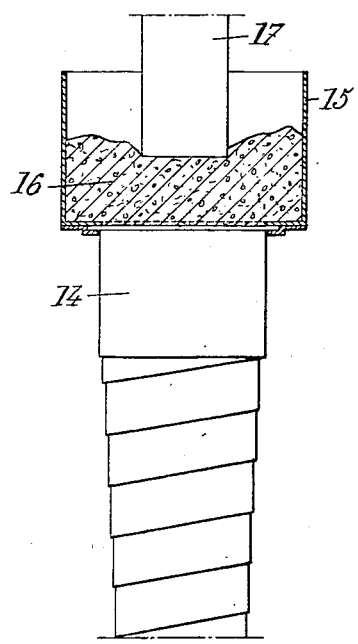
Fig. 8 illustrates a method of manufacturing building elements by means of one of the molds of the preceding figures.

In order to manufacture posts with such molds, I may distribute the moldable material in any suitable manner, such as used for instance in ordinary molds. I may also take advantage of the suction effect produced by the increase of the internal volume during the expansion of the initial roll. It suffices, for this purpose, to close one of the end turns, preferably the inner turn, with a cap having a solid end face such as 10 (Fig. 1) and to have the other end turn, which is left open, (designated by 14 on Fig. 8) immersed in a tank 15 filled with the moldable material 16. The above mentioned suction effect may be combined with an effect of gravity by placing turn 14 at a level higher than the other end turn or by a discharge effect produced for instance by a feed conduit under pressure 17 for the moldable material.

If the building element to be made is a tower or a post for electric lines, it is possible, if necessary, to dispose conductor wires inside said posts and in the direction of its length, so that the finished element includes wires embedded in the material forming the post, such wires serving for instance to connect together the top and bottom points of said electric lines.

In order to avoid, during the filling of the mold, that reinforcements 13 be driven by the flow of material to be molded, I may preliminarily inject a hardening foamy material, such as that known under the name of "colcrete," adapted to keep the reinforcements in position, while forming practically no obstacle subsequently to the flow of the material to be molded proper.

After the moldable material has set, the strip forming the mold may be torn away or it may be left to disappear by itself in the case of a paper strip, or it is possible to leave the mold in position in the case of a strip made of synthetic material or any other material which can give the finished product a particular external appearance.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A method of molding building elements of elongated shape which comprises rolling up a continuous strip of flexible material into at least one roll the turns of which at least substantially cover one another, pulling apart the ends of said strip in opposed directions parallel to the axis of said roll to a distance such that the successive turns of said strip overlap one another and filling with a moldable material the hollow elongated frustoconical body thus obtained.

2. A method according to claim 1 in which the mold is filled at least partly by the suction produced by the expansion of said mold when one of the ends thereof is closed whereas the other one is immersed in the material to be molded.

References Cited in the file of this patent

UNITED STATES PATENTS

| | | |
|---|---|---|
| 992,782 | Lambie | May 23, 1911 |
| 1,313,893 | Hess | Aug. 26, 1919 |
| 2,296,352 | Keller | Sept. 22, 1942 |
| 2,677,165 | Copenhaver | May 4, 1954 |